INVENTOR
Robert W. Kraeft

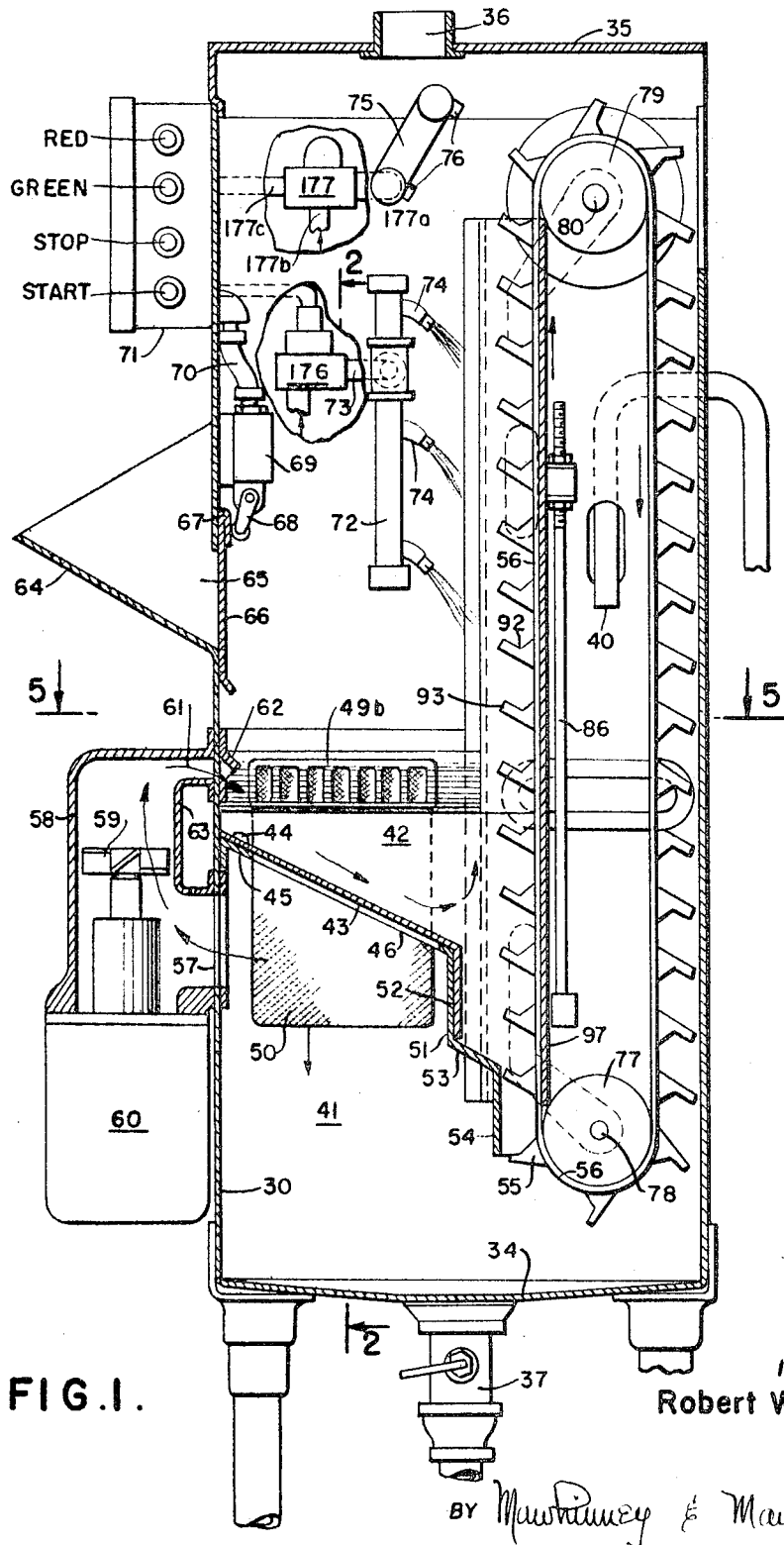
FIG.1.
INVENTOR
Robert W. Kraeft
BY 
ATTORNEYS

Sept. 2, 1969         R. W. KRAEFT         3,464,428
MACHINE FOR CLEANING AND DRYING TABLE SILVER
AND CONTROL MECHANISM THEREFOR
Original Filed Feb. 25, 1964          3 Sheets-Sheet 3

INVENTOR
Robert W. Kraeft

BY *Mawhinney & Mawhinney*

ATTORNEYS

United States Patent Office 3,464,428
Patented Sept. 2, 1969

3,464,428
MACHINE FOR CLEANING AND DRYING
TABLE SILVER AND CONTROL MECH-
ANISM THEREFOR
Robert W. Kraeft, 60 Commercial Ave.,
Moonachie, N.J. 07074
Original application Feb. 25, 1964, Ser. No. 347,226, now
Patent No. 3,247,858, dated Apr. 26, 1966. Divided
and this application June 14, 1965, Ser. No. 472,750
Int. Cl. C08b *3/00;* C23g *3/00*
U.S. Cl. 134—126                     5 Claims

ABSTRACT OF THE DISCLOSURE

Apparatus in which elongated silver articles are cleansed, rinsed, and dried in a continuous automatic operation by subjecting the articles to a vigorous cleansing action, to positioning in a common lengthwise orientation, to moving away from the cleansing action, to rinsing and then to a drying fluid.

The present invention relates to machine for cleaning and drying table silver and control mechanism therefor. This is a divisional application of Ser. No. 347,226 filed Feb. 25, 1964, Re: Kraeft 472,750 which matured into Patent No. 3,247,858 on Apr. 26, 1966.

An object of the present invention is to provide a completely automatic machine for cleansing table silverware.

Another object of the invention is to provide a machine for use in restaurant kitchens and the like adapted to handle large quantities of table silver involving cleansing and drying.

A further object of the invention is to provide a completely automatic control system for a machine as above described on which upon initiating operation the machine will automatically go through a cycle of cleansing, drying and orienting a preselected quantity of silverware subject to stoppage as each bin receives its capacity load of cleansed silver.

A still further object of the invention is to provide an improved form of cleansing unit in which an extremely efficient cleansing action is had.

A further object of the invention is to provide a machine embodying cleansing and drying units arranged for compactness to adapt the machine for small space installment.

The oriented silver is delivered to an endless conveyor on which the silver is subjected to a drying action.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a vertical sectional view taken on a magnified scale through the cleansing unit including the conveyor.

CLEANSING UNIT

Figure 2:
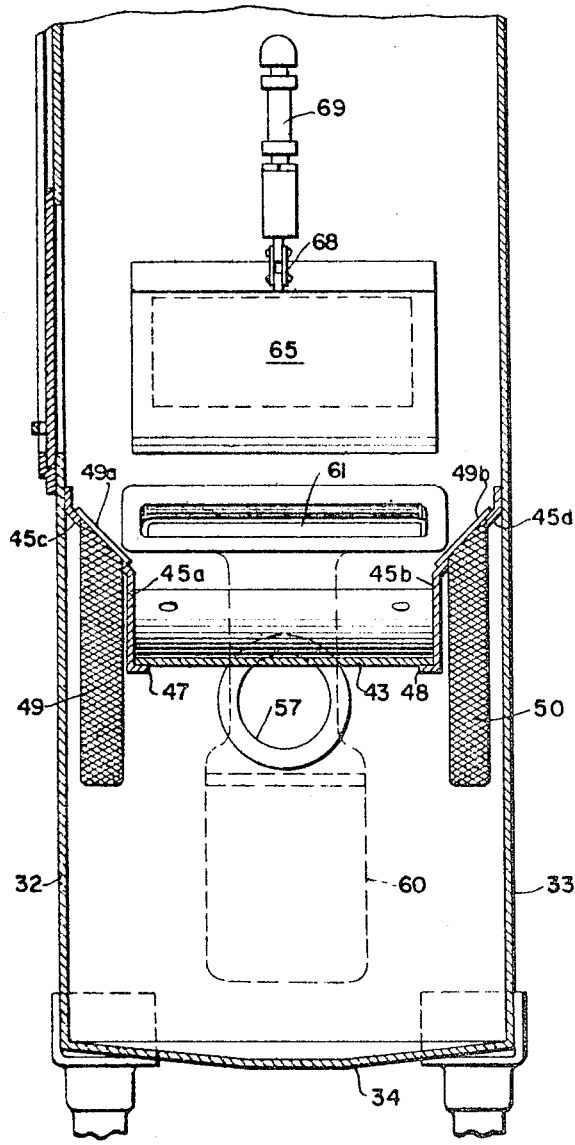
FIGURE 2 is a fragmentary vertical cross-sectional view taken on the line 2—2 in FIGURE 1.

As more particularly illustrated in FIGURES 1 to 5 inclusive, the cleansing unit is mounted in a casing which may be generally constituted of a front wall 30, a rear wall 31, side walls 32 and 33, a bottom wall 34 and a top wall 35 having a stack or vapor vent 36.

Figure 5:
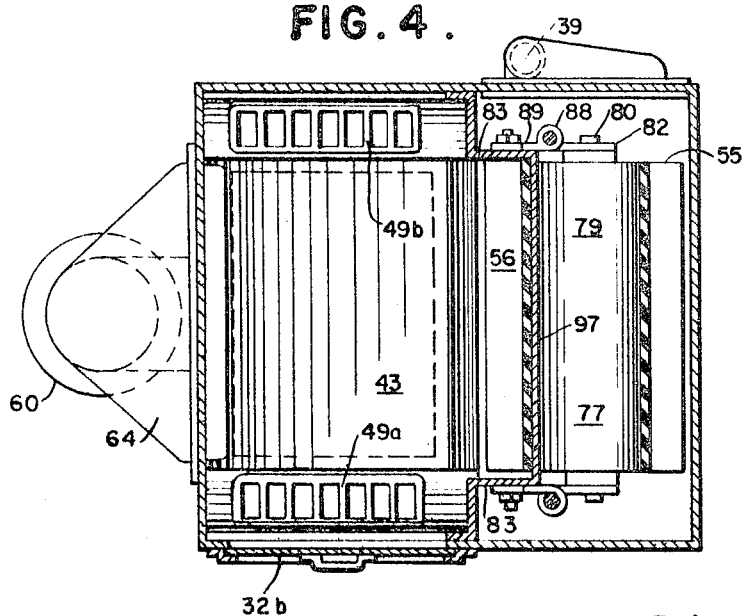
FIGURE 5 is a horizontal section taken on a somewhat magnified view on the line 5—5 in FIGURE 1.

In the bottom wall 34 is a cleansing liquid drain 37 having a controlling hand-actuated valve 38. The overflow 39 connects with this drain 37 below the valve 38, as shown in FIGURE 5.

Wash water is supplied to the interior of the casing in any suitable manner, for instance, by a pipe 40 shown more particularly in FIGURE 1. This wash water descends into the lower portion of the tank which constitutes a reservoir 41 for the wash water.

The reservoir 41 is divided from a cleansing chamber 42 by a suitable partition constituted mainly by a partition plate 43 preferably removable for cleaning and detachably secured as by the fastenings 44 to a frame 45 having an opening 46 through which, when the plate 43 is removed, access may be had from the cleansing chamber 42 down into the reservoir 41. The frame 45 may be constituted by the two side members 45$^a$ and 45$^b$ (FIGURE 2) having inturned flanges or ledges 47 and 48 upon which the detachable plate 43 may be, at least in part, supported as to side edges thereof.

Figure 4:
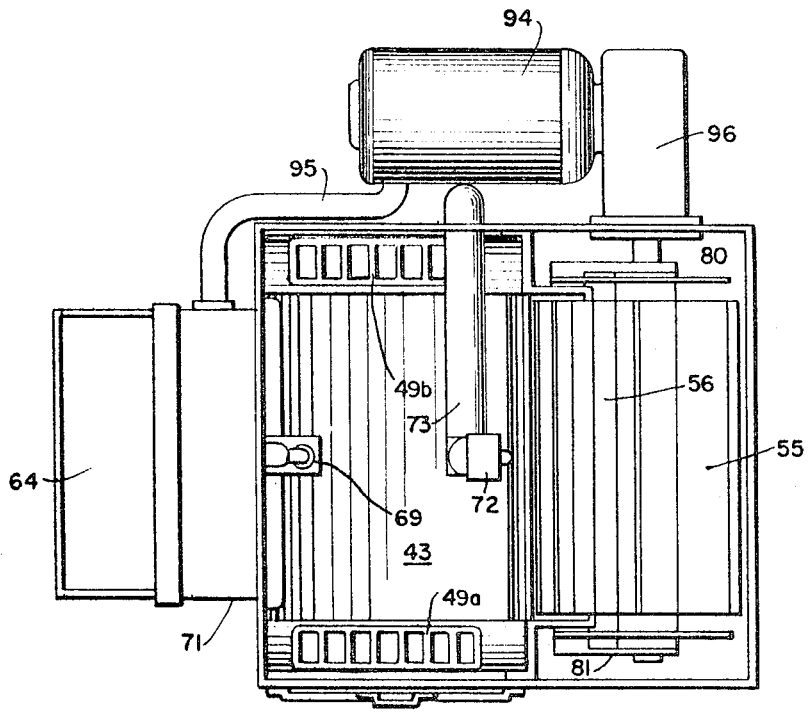
FIGURE 4 is an enlarged top plan view, with the casing cover removed, illustrating the cleansing chamber and the elevator.

The side members 45$^a$ and 45$^b$, as shown in FIGURE 2, are spaced inwardly from the side walls 32 and 33, there being diagonal sections 45$^c$ and 45$^d$ which are inclined and slotted to receive detachably therethrough strainers 49 and 50. These strainers may be of box or bag form having top frames 49$^a$ and 49$^b$ extending at a similar inclination to the diagonal parts 45$^c$ and 45$^d$ against which the frames 49$^a$ and 49$^b$ rest in the support of the strainers 49, 50. These frames 49$^a$ and 49$^b$ are open, preferably as indicated in FIGURE 4, in a grilled pattern for strength but to permit free entrance through the open mouths of the strainers of any foodstuffs or other foreign particles carried into the cleansing chamber 42 by the silver articles.

As shown in FIGURE 2 the inclinations of the mouths of the strainers 49, 50 induce sliding of foreign matter received above the strainers which are not admitted thereto down onto the partition plate 43 or into the body of agitated wash water in the chamber 42. Thus there are no horizontal ledges or shoulders in the wash chamber which would support accumulations of foreign matter.

As shown in FIGURE 1, the plate 43 is on a downward inclination from the front wall 30 rearwardly, and at its rear end terminates in an angular downward extension 51 which laps an upright wall 52 of the rear lower end of the frame 45. The upright wall of the frame 45 rises from the forward end of a diagonal wall 53 of the frame 45. In turn the lower end of the diagonal wall 53 merges or connects with the upper end of an upright tunnel wall 54 confining with the conveyor or elevator as hereinafter described, an upright tunnel for the upright movement therethrough of the cleats on the endless belt 56 of the conveyor.

As will be observed from FIGURES 1 and 2, the lower portions of the strainers 49 and 50 depend into the reservoir 41.

The reservoir 41 has, through the front wall 30, an opening 57 communicating with a pump chamber 58 containing an appropriate pump having an impeller 59 driven by an electric or other motor 60 carried by the pump casing. The impeller will preferably rotate in a substantially horizontal plane and have the vanes of its impeller so inclined as to lift wash water entering the pump chamber through the opening 57 and circulate such wash water through a port 61 into an upper forward portion of the cleansing chamber 42. The orifice 61, as shown in FIGURE 2, is preferably flat and has considerable lateral extension so that the wash water under the impetus of the pump will fan out on its introduction into the forward upper portion of the cleansing chamber 42.

As best seen in FIGURE 1, a deflector plate 62 is affixed, for instance, to the front wall 30, in position to hood the rear portion of the port 61 and deflect the wash water downwardly onto the silver articles in the chamber 42.

At 63 is illustrated simply a structural member carried externally by the front wall 30 or other appropriate part forming with the pump casing 58 a restricted passage in the area of the impeller 59 to promote efficient action of the propeller and a strong current of wash water to the cleansing chamber 42 with the result that in the chamber the wash water will be subjected to considerable agitation with the end in view of promoting rapid and thorough cleansing action.

The silverware is introduced into the open upper portion of the chamber 42 through a chute 64 attached externally of the front wall 30 at a point above the chamber 42, the front wall 30 being formed with an entrance opening 65 normally closed by an inwardly opening door 66 hinged or otherwise supported as at 67 to the internal surface of the front wall 30 at a point above the induction opening 65. This door 66 will open automatically under the weight and gravity feed of the silver articles sliding down the chute and into the interior of the casing.

A roller actuated arm 68 of a micro-switch 69, affixed internally to the front wall 30 above the door 66, rests against an internal portion of the door at a suitable point below the hinge axis to be automatically tripped incident to opening of the door 66. The micro-switch has electrical connections through conduit 70 to an electrical control box 71 conveniently mounted upon and exteriorly of the front wall 30 at an upper portion of the casing.

The wash water will be diverted by the inclined plate 43 downwardly in a rear direction and may descend through a trough comprised between the downward extension or apron 51 of the plate 43 and the front ascending leg of the conveyor or elevator 56.

The trough is narrow in respect to knives, forks, spoons and the like table silver articles so that these long narrow articles will be adjusted in descending into the trough to a lengthwise orientation suitable for receiving upon the upper surfaces of the cleats 55 of the conveyor. It will be noted also preferably from FIGURE 1 that the presence of the diagonal wall 53 at the base of the trough contributes to the delivery of the articles to the cleats 55.

Still referring more particularly to FIGURE 1, a stand pipe 72 is supported in the space above the chamber 42 to which rinse water may be delivered through a lateral pipe 73 and issue from nozzles or jets 74 upon the silver in the pockets of the conveyor cleats. There are preferably a number, three being shown, of the nozzles 74 at various elevations. This rinse water is preferably at an elevated temperature and if desired supplied to the nozzles under suitable pressure.

It will also be understood of course that the wash water may be heated and that suitable detergent may be included therewith.

In the uppermost portion of the front casing is a drying unit 75 including suitable ducting and spray nozzles 76 positioned to direct sprays of hot or drying air or fluid upon the silverware being carried at the upper portion of the conveyor.

As shown in FIGURE 2, the side wall 32 has a frame 32ᵃ for a vertically sliding door 32ᵇ which exposes an opening through which access may be had to the interior of the cleansing chamber 42.

THE CONVEYOR

Referring more particularly to FIGURES 1, 4 and 5, the conveyor belt 56 which may be of any suitable flexible material calculated to withstand the ravages of water, both hot and cold, and hot air, is trained about a lower roller 77 journalled to rotate about an axis 78 and an upper roller 79 journalled to rotate about an axis 80. The axes 78 and 80 are preferably in vertical alignment or substantially so in order that the conveyor may be strictly vertical and, for instance, not inclined as an inclined elevator or conveyor demands more lengthwise space in the case and a generally longer casing.

In view of the limitations of space in which machines of this kind are to be installed, it is desirable that the lengthwise dimension of the machine as a whole shall be as small as possible consistent with other requirements imposed on a machine for performing this varied work.

Figure 3:
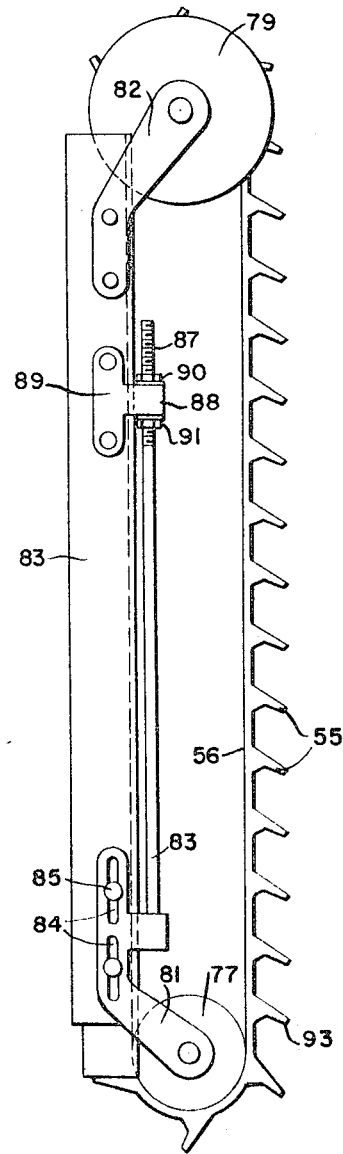
FIGURE 3 is an end elevational view of a form of elevating conveyor for transferring the silver articles from the cleansing chamber to the assorter, and illustrating a form of belt tightener.

As shown more particularly in FIGURE 3, lower brackets 81 and upper brackets 82 support the trunnions of the rollers 77 and 79, such brackets being affixed to structural members 83 mounted in the casing in any suitable manner. The brackets of one or other of the rollers; in this instance, the brackets 81 of the lower roller 77, are provided slots 84 adjustable up and down with respect to screws or other fastenings 85 which enter the structural members 83. The bracket 81 is connected to a rod 86 having a threaded upper end 87 passing up through a lug or eye 88 of a bracket 89. Nuts 90, 91 are threaded on the rod 86 and engage opposite sides of the lug or eye 88 to maintain the adjustment after the same has been made. By backing off the nuts 90, 91, the rod 86 may be pushed downwardly to tighten the belt.

This belt tightening arrangement may be repeated at both sides of the conveyor as indicated in FIGURE 5 where two structural members 83 are shown.

As shown to best advantage in FIGURE 1, the cleats 55 are of a construction which contributes to the upright positioning of the conveyor in that these cleats are cupped on upper surfaces of the ascending run of the conveyor. Such formation provides depressed pockets 92 and upturned free edges 93. These cleats may be made from rubber, a rubber composition or a suitable plastic or the like which may be vulcanized or otherwise affixed to the belt at suitably spaced distances apart so that the silverware will be easily accommodated in the space between adjacent cleats.

As shown more particularly in FIGURE 4, the belt is driven by an electric or other motor 94 receiving current through wires in a conduit 95 extending to the control box 71. The motor 94 drives a reduction gear 96 connected to the upper shaft 80 of the conveyor.

As shown more particularly in FIGURES 1 and 5, a vertical wall 97 is connected laterally between the structural members 83 positioned rearwardly of the ascending belt 56 of the conveyor and constituting a backing therefor to maintain generally alignment of the belt and its cleats and to prevent sagging of the cleats under load. This wall 97 is of value also in the area rearwardly of the trough and tunnel to prevent accumulations of silver in the trough and to oppose rearward thrusts of the silverware against the front side of the forward run of the conveyor. In other words, this wall 97 will keep the ascending run of the conveyor and its cleats up to the work.

The cleats are narrow for the accommodation of the silver and the orientation of the latter to lengthwise positions in the trough cooperates with the formation of the cleats to individually receive and elevate the various silver articles.

An assorter as illustrated in FIGURES 2, 3 and 9 through 14 and described in my above mentioned Patent No. 3,247,858 may have communication with the upper portion of the descending run of the conveying elevator to receive the silverware articles unloaded from the cleats of the conveyor incident to the movement of such cleats around the upper roller 79 of the conveyor.

IN OPERATION

Assuming that the pump motor 60 and the conveyor motor 94 are energized and silver articles have been introduced through the entrance chute 64 into the cleansing chamber 42 the pump motor 60 thereupon drives the pump impeller 59 bringing up wash water from reservoir 41 through the pump casing 58 and delivers the same through the port 61 upon the silver in the cleansing chamber 42. This will promptly build up a liquid level in the chamber in the vicinity of the port 61 so that the incoming liquid entering forcibly through this pump will create great agitation of the liquid in the chamber 42, thus tending to cleanse the silverware and dislodge all particles or foreign matter adhering thereto, which foreign matter will be generally deposited in the strainers 49, 50. The wash water, with or without detergent, will be re-circulated through the strainers to the reservoir 41 forming a closed cycle for the turbulent wash water and insuring that such water in circuit is forcibly driven by the pump into a continuously agitated state in the cleansing chamber 42.

Incident to this cleansing operation, the silverware is being moved by gravity through the inclination of the bottom plate 43 down to the trough rearward of the walls 51 and 52, and this trough in combination with the angularity of the plate 43 will induce the elongated narrow silverware to seek a position in the trough in which lengthwise the silver alines with the pockets of the cleats 55 of the elevator and is thus induced to an attitude favorable to the movement of the silver articles into the successive pockets of the elevator cleats 55. The inclination of the wall 53 at the bottom of the trough will serve to cause sliding of the articles onto the cleats where the same will be retained in the pockets of the cleats owing to the formation thereof presented in the rising run of the elevator or conveyor.

The conveyor being in continuous operation at this time, the cleats will elevate the silver articles up in a substantially vertical path confronting the rinse unit 72 where fresh heated water will be sprayed upon the silver articles in the ascending pockets and remove all wash water therefrom and impose upon the silver articles a final cleansing step.

On ascending further in the conveyor the silver articles will be exposed to the sprays from the nozzles 76 of heated air or other gas which will thereupon dry the silver before the same is passed to the assorter mentioned above.

As shown more particularly in FIGURE 1, the cleats in moving around the upper roller 79, will dump or unload the silver articles from the conveyor cleats into the assorter as mentioned above.

While, for convenience in description, the objects treated have been identified as table silver, it will be uderstood that the machine may be applied to any other articles which require the cleansing and/or assorting operations of which the machine is capable.

In FIGURE 4 a solenoid valve 176 is shown as having an output 73 to the hot water stand pipe 72 and an inlet shown by the arrow as connecting with a source of heated water supply. This solenoid actuated valve is also shown as electrically connected with the control box 71.

A second solenoid valve 177 is connected by pipe 177ᵃ to the hot air spray unit 75 and through a pipe 177ᵇ to a source of heated air supply. At 177ᶜ the solenoid valve 177 is shown as electrically connected to the control box 71.

The device in effect turns itself on (after initially pre-filling the wash reservoir) by the entry of silverware through the spring-loaded door 65 which actuates switch 69.

Complete washing is accomplished by a total immersion of the flatware in filtered re-circulated detergent-laden water, the articles being thoroughly scrubbed by the action of a high velocity stream propelled by a self-contained pump which properly directs the flow of water through and around the silverware.

As the washing progresses, the pieces are removed from the bath by an endless conveyor which has cleats designed to permit the transport of only one piece at a time through a hot water rinse section (preferably at substantially 180 degrees F.) and thereupon through the drying area where the latent heat, absorbed in the rinse section, accelerates natural air drying. Spot-free drying is accordingly secured.

The machine need not be hand-loaded but an initial conveyor may deliver articles to the initial chute 64.

Although I have disclosed herein the best forms of the invention known to me at this time, I reserve the right to all such modifications and changes as may come within the scope of the following claims.

What is claimed is:
1. A machine for cleansing table silver comprising
 (a) a cabinet having a front wall,
 (b) a cleansing chamber in the cabinet,
 (c) an inclined bottom wall for the chamber,
 (d) means for introducing cleansing fluid to the chamber at substantially the upper portion of the inclined bottom wall,
 (e) a narrow elongated trough accessible to the lower portion of the inclined bottom wall for adjusting the silver to a lengthwise orientation, said trough having
 (f) an inclined bottom wall,
 (g) a conveyor having
 (h) cleats moving past the lower end of the trough bottom wall for receiving the silver articles and removing the same from the trough and chamber.

2. A machine for cleansing table silver comprising
 (a) a cleansing chamber having front and rear portions with the rear portion open,
 (b) a bottom wall for the chamber inclining downwardly from front to rear,
 (c) means for introducing cleansing fluid to the front portion of the chamber above the inclined wall,
 (d) a narrow elongated trough extending downwardly off the lower end of the inclined bottom wall for adjusting the silver articles to a lengthwise orientation,
 (e) the rear portion of the trough being open,
 (f) an inclined bottom wall for the trough inclining in a rearward direction,
 (g) a conveyor having
 (h) cleats movable substantially upwardly in close proximity to the lower rear end of the trough inclined bottom wall to induce delivery of the articles from the trough to the cleats so that the pieces of silver will be raised by the conveyor out of the liquid in the cleansing chamber.

3. A machine for cleansing table silver comprising
 (a) a cleansing chamber for the silver,
 (b) an inclined bottom wall for the chamber,
 (c) a narrow elongated trough accessible to the lower portion of the inclined bottom wall for adjusting the silver to a lengthwise orientation, said trough having
 (d) an inclined bottom wall,
 (e) a conveyor having
 (f) cleats moving past the lower end of the trough bottom wall for receiving the silver articles and removing the same from the trough and the chamber, and
 (g) a tunnel offset rearwardly and downwardly from the inclined bottom wall of the trough through which the conveyor cleats move prior to passage past the trough.

4. A machine for cleansing table silver comprising
 (a) a cabinet having a front wall,
 (b) a cleansing chamber in the cabinet,
 (c) an inclined bottom wall for the chamber,
 (d) means for introducing cleansing fluid to the chamber at substantially the upper portion of the inclined bottom wall,
 (e) a narrow elongated trough accessible to the lower portion of the inclined bottom wall for adjusting the silver to a lengthwise orientation, said trough having
 (f) an inclined bottom wall, (g) a conveyor having (h) cleats moving past the lower end of the trough bottom wall for receiving the silver articles and removing the same from the trough and chamber, (i) a tunnel offset rearwardly and downwardly from the inclined bottom wall of the trough through which the conveyor cleats move prior to passage past the trough.

5. A machine for cleansing table silver comprising (a) a cleansing chamber, (b) means for promoting a current of cleansing liquid to and through the chamber into which articles of table silver are delivered, (c) a narrow trough in the chamber for receiving the silver after cleansing and for adjusting the silver to a common lengthwise orientation, said trough having (d) an open portion, and (e) conveying means positioned to move past the open portion of the trough for picking up the cleansed silver and removing same from the cleansing chamber, (f) a tunnel offset laterally and downwardly from the trough through which the conveyor is adapted to move, the trough having (g) an inclined bottom wall inclining toward the conveyor for inducing transfer of the silver pieces onto the conveyor.

References Cited

UNITED STATES PATENTS

| | | | |
|---|---|---|---|
| 1,252,302 | 1/1918 | Riesenecker | 134—32 XR |
| 1,710,357 | 4/1929 | Grunwald | 134—67 XR |
| 1,847,256 | 3/1932 | Nielsen | 134—25 |
| 1,864,064 | 6/1932 | Hall | 134—73 |
| 2,015,512 | 9/1935 | Brogden et al. | 134—68 |
| 2,180,947 | 11/1939 | Ball | 134—74 |
| 2,314,048 | 3/1943 | Ladewig | 134—104 |
| 2,537,904 | 1/1951 | McAllister | 134—25 |
| 2,714,257 | 8/1955 | Reading | 134—73 XR |
| 3,103,225 | 9/1963 | Schmitt-Matzen | 134—58 |
| 3,122,148 | 2/1964 | Alabaster | 134—111 XR |
| 3,132,655 | 5/1964 | Anderson | 134—68 |

MORRIS O. WOLK, Primary Examiner

JOSEPH T. ZATARGA, Assistant Examiner

U.S. Cl. X.R.

134—25, 32, 133